(12) United States Patent
Mauller et al.

(10) Patent No.: US 10,360,641 B2
(45) Date of Patent: *Jul. 23, 2019

(54) HYBRID ELECTRONIC LOCKBOX

(71) Applicant: Bank of America Corporation, Charlotte, NC (US)

(72) Inventors: Janet M. Mauller, Charlotte, NC (US); Tera L. Howe, Virginia Beach, VA (US); Amy Lamb, Manchester, MD (US); James Dillon, Kansas City, MO (US); Gerald Whitney Wilson, III, Mead, WA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/982,594

(22) Filed: May 17, 2018

(65) Prior Publication Data

US 2018/0276763 A1    Sep. 27, 2018

Related U.S. Application Data

(63) Continuation of application No. 14/458,928, filed on Aug. 13, 2014, now Pat. No. 9,984,423.

(51) Int. Cl.
*G06Q 40/00* (2012.01)
*G06Q 20/14* (2012.01)
(Continued)

(52) U.S. Cl.
CPC ............. *G06Q 40/12* (2013.12); *G06Q 20/10* (2013.01); *G06Q 20/102* (2013.01); *G06Q 20/14* (2013.01);
(Continued)

(58) Field of Classification Search
CPC ...... G06Q 20/10; G06Q 20/14; G06Q 20/102; G06Q 40/00; G06Q 40/02; G06Q 40/10; G06Q 40/12
See application file for complete search history.

(56) References Cited

U.S. PATENT DOCUMENTS 5,644,778 A    7/1997   Burks et al.
6,304,860 B1  10/2001   Martin, Jr. et al.
(Continued)

OTHER PUBLICATIONS

Anderson, Milton. "The electronic check architecture." Financial Services Technology Consortium 123 (1998).*
(Continued)

*Primary Examiner* — Asfand M Sheikh
(74) *Attorney, Agent, or Firm* — Banner & Witcoff, Ltd.; Michael A. Springs

(57) ABSTRACT

A method of managing an electric lockbox, such as to reduce processing times associated with remittance processing, may include receiving, by one or more computing devices at a financial institution, a batch file and/or one or more physical remittances at lockbox associated with a payee, the batch file and any physical remittances comprising information associated with a plurality of financial transactions between one or more payors and the payee. The one or more computing devices may then determine whether at least a portion of the information corresponds to a payee preference. A report may be communicated to the payee, the report including a record of the plurality of financial transactions as a set of documents corresponding to the payee preference. In some cases, the report may include at least a portion of the remittance information associated with the plurality of financial transactions deposited into an account associated with the payee.

20 Claims, 13 Drawing Sheets

(51) Int. Cl.
*G06Q 20/10* (2012.01)
*G06Q 40/02* (2012.01)
*G06Q 20/00* (2012.01)

(52) U.S. Cl.
CPC ............. *G06Q 40/00* (2013.01); *G06Q 40/02* (2013.01); *G06Q 40/10* (2013.01)

(56) References Cited

U.S. PATENT DOCUMENTS

| | | |
|---|---|---|
| 6,453,297 B1 | 9/2002 | Burks et al. |
| 6,757,898 B1 | 6/2004 | Ilsen et al. |
| 7,021,530 B2 | 4/2006 | Hoch |
| 7,113,925 B2 | 9/2006 | Waserstein et al. |
| 7,233,929 B1 | 6/2007 | Lingle et al. |
| 7,516,101 B2 | 4/2009 | Remington et al. |
| 7,725,335 B1 | 5/2010 | Goodwin |
| 8,032,415 B2 | 10/2011 | Sanders et al. |
| 8,045,784 B2 | 10/2011 | Price et al. |
| 8,185,471 B1 | 5/2012 | Walker et al. |
| 8,589,288 B1 * | 11/2013 | Meyer ................... G06Q 40/00 705/35 |
| 8,622,661 B2 * | 1/2014 | Inamasu ................... B23C 5/10 407/11 |
| 8,630,947 B1 * | 1/2014 | Freund ................. G06Q 10/109 705/40 |
| 8,682,788 B2 | 3/2014 | Neinast et al. |
| 8,867,783 B2 * | 10/2014 | Neinast .................. G06Q 40/00 382/101 |
| 2002/0138426 A1 * | 9/2002 | Craddick ............... G06Q 20/00 705/40 |
| 2004/0188522 A1 | 9/2004 | Ashaari |
| 2004/0260577 A1 | 12/2004 | Dahlin et al. |
| 2005/0065893 A1 | 3/2005 | Josephson |
| 2006/0219601 A1 | 10/2006 | Babanats et al. |
| 2006/0253405 A1 | 11/2006 | Nirenberg |
| 2007/0265887 A1 | 11/2007 | McLaughlin et al. |
| 2007/0282743 A1 | 12/2007 | Lovelett et al. |
| 2008/0040249 A1 | 2/2008 | Re et al. |
| 2008/0059223 A1 | 3/2008 | Lu et al. |
| 2008/0086421 A1 | 4/2008 | Gilder et al. |
| 2008/0103791 A1 | 5/2008 | Heiden et al. |
| 2008/0109355 A1 | 5/2008 | Dutta et al. |
| 2008/0154751 A1 | 6/2008 | Miles |
| 2008/0158615 A1 | 7/2008 | Parkos et al. |
| 2009/0005901 A1 | 1/2009 | Stemmle et al. |
| 2009/0164662 A1 | 6/2009 | Mather |
| 2009/0244600 A1 | 10/2009 | Haycock et al. |
| 2009/0319424 A1 | 12/2009 | Calman et al. |
| 2010/0038839 A1 * | 2/2010 | DeWitt ............. G06K 9/00442 270/52.01 |
| 2010/0153310 A1 | 6/2010 | Huebler |
| 2010/0161466 A1 | 6/2010 | Gilder |
| 2011/0098846 A1 | 4/2011 | Yeung et al. |
| 2013/0018787 A1 | 1/2013 | Andrews et al. |
| 2013/0179343 A1 | 7/2013 | McCarley |
| 2013/0182887 A1 * | 7/2013 | Neinast .................. G06Q 40/00 382/101 |
| 2013/0185200 A1 * | 7/2013 | Neinast .................. G06Q 40/00 705/40 |
| 2013/0226798 A1 * | 8/2013 | Orttung ................ G06Q 20/027 705/44 |
| 2016/0048813 A1 * | 2/2016 | Mauller ............... G06Q 20/102 705/30 |

OTHER PUBLICATIONS

Wachovia What's Ahead, http://www.wachovia.com/wnewsletter/article/printer/0,,49_125_1,00.html, downloaded Apr. 8, 2007, 2 pages.

RelayHealth, Press Releases, RelayHealth's Patient Compass Online Business Office Solution Achieves New Milestone as Hospital Adoption Rate Soars 80 Percent; https://www.relayhealth.com/rh/general/news/newsRecent/news110.aspx, downloaded Mar. 18, 2008, 3 pages.

JP Morgan Chase and McKesson Form Strategic Relationship to Transform and Simplify Healthcare Claim and Payment Processing, http://www.jpmorgan.com/cm/Satellite?c=JPM_Content_C&cid=11593 . . . , downloaded Sep. 24, 2007, 2 pages.

Bank of America Newsroom—Press Releases, Bank of America Launches New EOB Data Capture Image Lockbox Service for Healthcare Providers, http://bankofamerica.mediaroom.com/index.php?s=press_releases&Item=7003, downloaded Apr. 8, 2007, 3 pages.

Bank of America Acquires Georgia Healthcare Financial Services Firm, Posted Sep. 11, 2006, http://www.wral.com/business/local_tech_wire/news/story/1167867/, downloaded Apr. 8, 2007, 1 page.

Bank of America Unveils New Image Lockbox for Healthcare Providers, http://www.cbronline.com/article_news.asp?guid=2A883A13-E2FD-48CC-AE4C-BD7277EB3035, downloaded Apr. 8, 2007, 1 page.

HealthLogic Systems Corporation, Healthcare Revenue Cycle, http://www.hlsc.com/default.htm, downloaded Apr. 8, 2007, 1 page.

Health Data Management, Bank Jumps into Health I.T.; http://www.healthdatamanagement.com/portals/article.cfm?type=manag . . . downloaded Apr. 8, 2007, 1 page.

Bank Technology News, BTN, Paper Checking Out of Medical Payments, http://www.americanbanker.com/printthis.html?id=20071016E78KLZJB&btn=true, downloaded Dec. 10, 2007, 1 page.

* cited by examiner

HYBRID ELECTRONIC LOCKBOX

CROSS-REFERENCE TO RELATED APPLICATIONS

This application is a continuation of U.S. patent application Ser. No. 14/458,928 entitled "Hybrid Electronic Lockbox", which is hereby incorporated by reference in its entirety.

BACKGROUND

Entities, such as financial institutions, provide a lockbox service for many of their clients. The clients that use the lockbox service are typically businesses that receive payments from their customers. For instance, when their customer pays a utility bill, such as a cable television bill, to a utility provider, the customer sends the payment to a lockbox address, which may be, for example, a post office box, rather than directly to the utility provider. The financial institution, through an intermediate, such as a courier, regularly picks up the payments from the lockbox, opens them, scans them, and processes the payments for the financial institution's client. The lockbox service takes care of the entire process, from payment handling to crediting the client's account.

Currently, the U.S. Postal Service or other mail delivery service must physically carry each payment envelope to the physical lockbox address. Because the customers can be geographically diverse, this often results in one or more days of delay between dropping off of the payment paper document and receiving the payment paper document at the lockbox address. As such, there remains a need for improved systems and techniques for minimizing time delays caused by delivery of one or more payment paper documents via a mail delivery service.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

In some cases, a method for managing an electric lockbox for remittance processing may include receiving, at a computer device at a financial institution, a batch file at an electronic lockbox associated with a payee, the batch file including communications information associated with correspondence between at least one payor (e.g., a consumer, a third-party on behalf of the consumer, and the like) and the payee. In some cases, the method may include receiving one or more physical remittances corresponding to correspondence between the at least one payor and the payee. The computer device may then determine whether at least a portion of the communications information included in the batch file corresponds to a payee request. In some cases, the method may include receiving one or more physical remittances corresponding to correspondence between the at least one payor and the payee, where the correspondence is communicated as either an entry in the batch file or as a physical remittances based on the payee request. The computer device may then communicate a consumer correspondence report to the payee, the consumer correspondence report including at least the portion of the communications information that corresponds to the payee request. In some cases, the communications information may include at least a portion of the remittance information associated with one or more payments deposited into an account associated with the payee.

In some examples, an apparatus may include a communications interface communicatively coupled to a network, a processor communicatively coupled to the communications interface, and a non-transitory memory device communicatively coupled to the processor and the communications interface. In some instances, the non-transitory memory device may store instructions that, when executed by the processor, configure to apparatus to communicate, via the network, a driver file to a payment processor. The driver file may provide information corresponding to a specified format of a batch file that may include consumer communications received by the payee. The apparatus may then be configured to receive the batch file via the network, where the batch file may include consumer communications information received by the payment processor within a specified time period. The apparatus may assign the batch file to an electronic lockbox associated with the payee and report the consumer communications information to the payee. In some cases, the apparatus may assign the batch file to a hybrid electronic lockbox when a payee preference indicates that at least a portion of the consumer communications information may be physically delivered separate from the batch file.

In some examples, another illustrative method may include receiving, by a computer device, a payee request file from a payee. The payee request file may include one or more reporting requests associated with consumer communications received at a payment processor. The computer device may create a driver file based on the one or more requests received in the payee request file, where the driver file may specify at least a format for a batch file for providing information corresponding to one or more consumer communications associated with the payee that may be received at the payment processor. The computer device may assign the batch file to an electronic lockbox associated with the payee. In some cases, the batch file may include information corresponding to the one or more consumer communications received at the payment processor. The apparatus may then create a report that may include at least some of the one or more consumer communications received in the batch file, wherein each of the one or more consumer communications is delimited by a delimiter defined in the payee request file. In some cases, a report may include information about one or more physical remittances when the electronic lockbox corresponds to a hybrid electronic lockbox.

Some aspects as disclosed herein may be directed to, for example, managing the lockbox service and reducing the delay between mailing a payment and crediting a client's account. Any type of electronic lockbox may be contemplated within the scope of this disclosure. For example, the lockbox may be a wholesale lockbox, a retail lockbox, or a government lockbox. In some cases, the lockbox may be configured to receive a batch file from a payment processor, physical remittances or a combination of a batch file and physical remittances. The payment processor may include any type of remittance sent by a consumer in payment to a payee within the batch file. In some cases, the payment processor may physically deliver consumer correspondence information to the lockbox provider based on one or more business rules or governmental regulations. A lockbox service may include any type of remittance payment processing, for example, domestic payments may be processed or international payments may be processed. In some cases, the lockbox service may reject a remittance payment when a funds type (e.g., a domestic funds type and an international funds type) is different than expected.

Historically, much of the consumer communications was sent via a postal service for collection at a payment processor computer system and/or at an electronic lockbox system. As such, many delays were introduced into the consumer communications processing merely by sending the information via the normal mail service, or other physical messaging systems. In the system 200, much of these latencies may be reduced by communicating at least a portion of the consumer communications electronically. For example, a period of time between when the consumer sends the communications to a payment processor computer system to when a deposit was made into a payee account by the electronic lockbox system and/or when a summary report is delivered to a payee may be significantly reduced by reducing or even eliminating the amount of physical communications that are sent (e.g., not physically sending paper copies of the collected communications, sending a subset of the collected communication, and the like) between the different organizations.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1A:
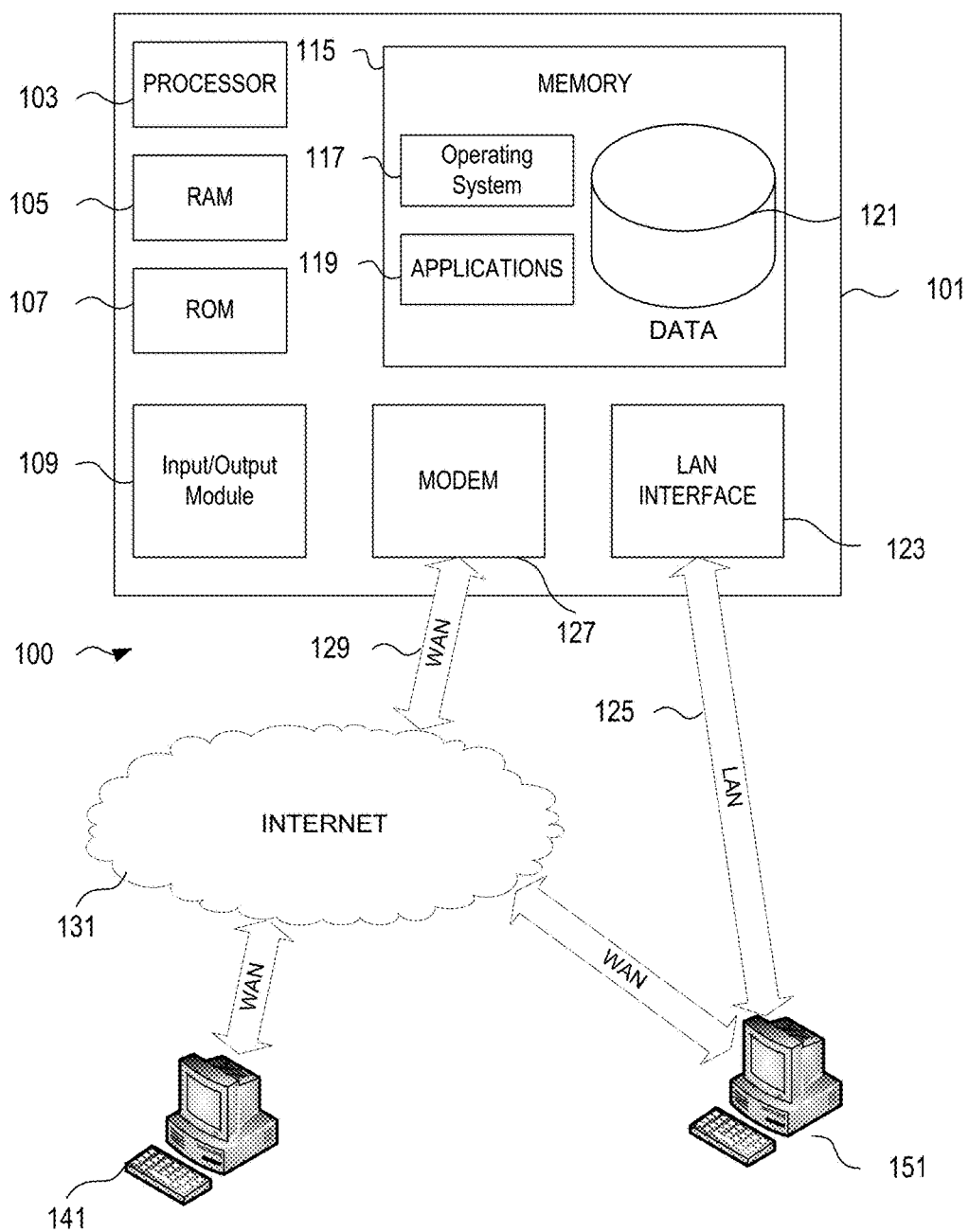
FIG. 1A shows an illustrative operating environment in which various aspects of the disclosure may be implemented.

FIG. 1A illustrates an example block diagram of a computing device 101 (e.g., a computer server, desktop computer, laptop computer, tablet computer, and the like) in an example computing environment 100 that may be used according to one or more illustrative embodiments of the disclosure. The computing device 101, in this example, may have a processor 103 for controlling overall operation of the server and its associated components, including for example random access memory (RAM) 105, read-only memory (ROM) 107, input/output (I/O) module 109, and memory 115.

I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 115 and/or other storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown).

The computing device 101 may operate in a networked environment supporting connections to one or more remote computers, such as terminals 141 and 151. The terminals 141 and 151 may be personal computers or servers that include many or all of the elements described above with respect to the computing device 101. The network connections depicted in FIG. 1A include a local area network (LAN) 125 and a wide area network (WAN) 129, but may also include other networks. When used in a LAN networking environment, the computing device 101 may be connected to the LAN 125 through a network interface or adapter 123. When used in a WAN networking environment, the computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 101 and/or terminals 141 or 151 may also be mobile terminals (e.g., mobile phones, smartphones, PDAs, notebooks, and the like) including various other components, such as a battery, speaker, and antennas (not shown). Any of the elements of FIG. 1A may be or otherwise include one or more computing devices.

The disclosure is operational with numerous types of general purpose or special purpose computing devices. Examples of well-known computing devices that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include multiple networked computing devices such as any of the above systems or devices, and the like.

Figure 1B:
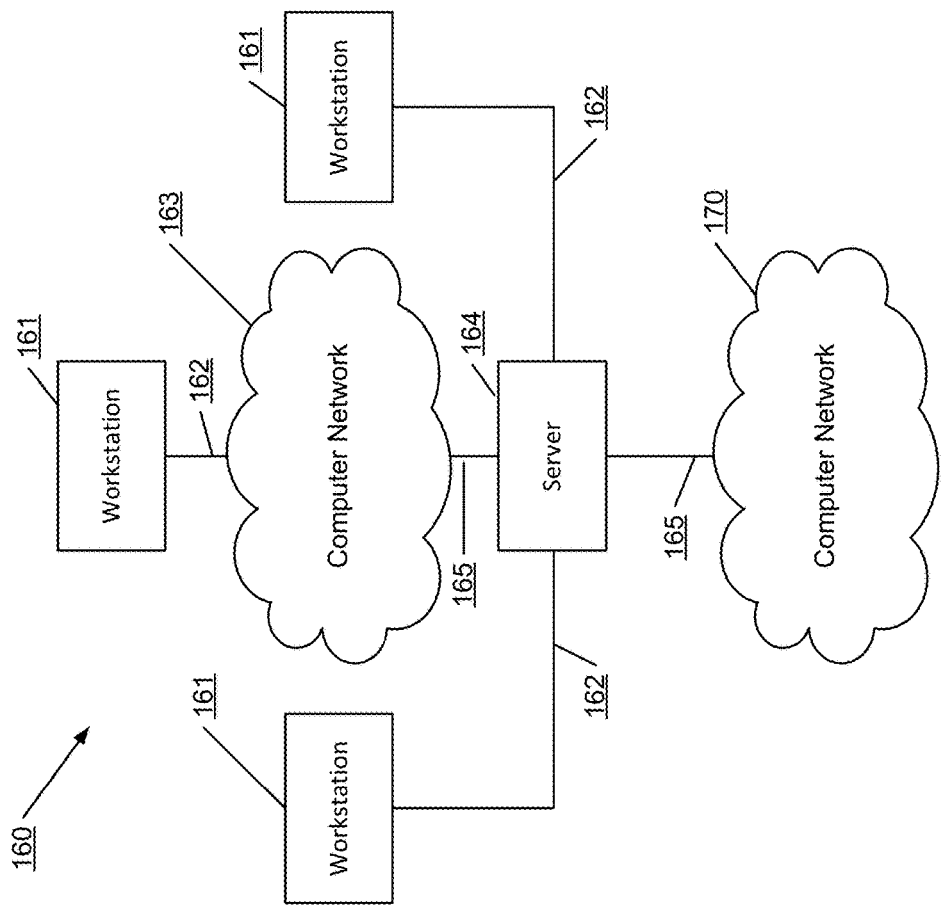
FIG. 1B shows another illustrative operating environment in which various aspects of the disclosure may be implemented.

FIG. 1B illustrates another example operating environment in which various aspects of the disclosure may be implemented. Any of the elements of FIG. 1B may be or otherwise include one or more computing devices. As illustrated, a system 160 may include one or more workstations 161. The workstations 161 may, in some examples, be connected by one or more communications links 162. A computer network 163 may be linked via communications links 165 to a server 164. In the system 160, the server 164 may be any suitable server, processor, computer, or data processing device, or combination of the same. The server 164 may be used to process the instructions received from, and the transactions entered into by, one or more participants.

According to one or more aspects, the system 160 may be associated with (e.g., owned, controlled by, and/or physically located at the premises of) a financial institution, such as a bank. Various elements may be located within the financial institution and/or may be located remotely from the financial institution. For instance, one or more workstations 161 may be located within a branch office of a financial institution. The workstations 161 may be used, for example, by customer service representatives or other employees of the financial institution in conducting financial transactions or payment processing via the network 163. Additionally or alternatively, one or more workstations 161 may be located at a remote location. The workstations 161 also may be used in conducting financial transactions or payment processing via the computer network 163 or computer network 170.

The computer network 163 and the computer network 170 may be any suitable computer networks including the Internet, an intranet, a wide-area network (WAN), a local-area network (LAN), a wireless network, a digital subscriber line (DSL) network, a frame relay network, an asynchronous transfer mode network, an electronic private network (VPN), or any combination of any of the same. The communications links 162 and 165 may be any communications links suitable for communicating between the workstations 161 and server 164, such as network links, dial-up links, wireless links, hard-wired links, and the like.

Figure 2:
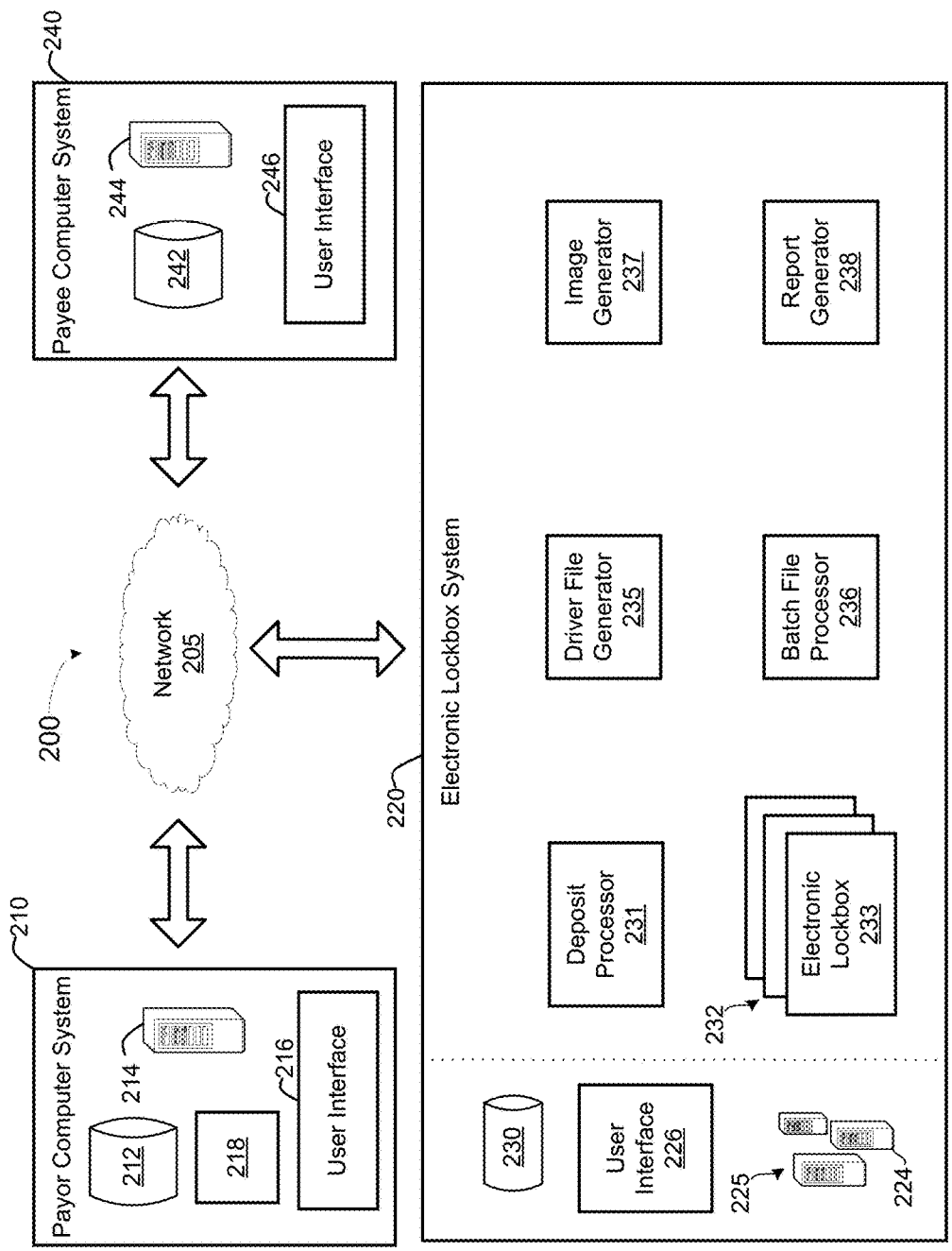
FIG. 2 illustrates an example of at least a portion of a system for providing consumer communications to an electronic lockbox system according to one or more illustrative aspects described herein.

FIG. 2 illustrates an example of at least a portion of a system 200 for providing consumer communications to an electronic lockbox system 220 according to one or more illustrative aspects described herein. In some cases, the system 200 may include a payment processor computer system 210, an electronic lockbox system 220, and/or a payee computer system 240. In some cases, the payee computer system 240 may include a data repository 242, a computer device 244, such as the computing device 101 of FIG. 1A and/or a user interface 246. Any of the elements of FIG. 2 may be or otherwise include one or more computing devices.

Figure 9:
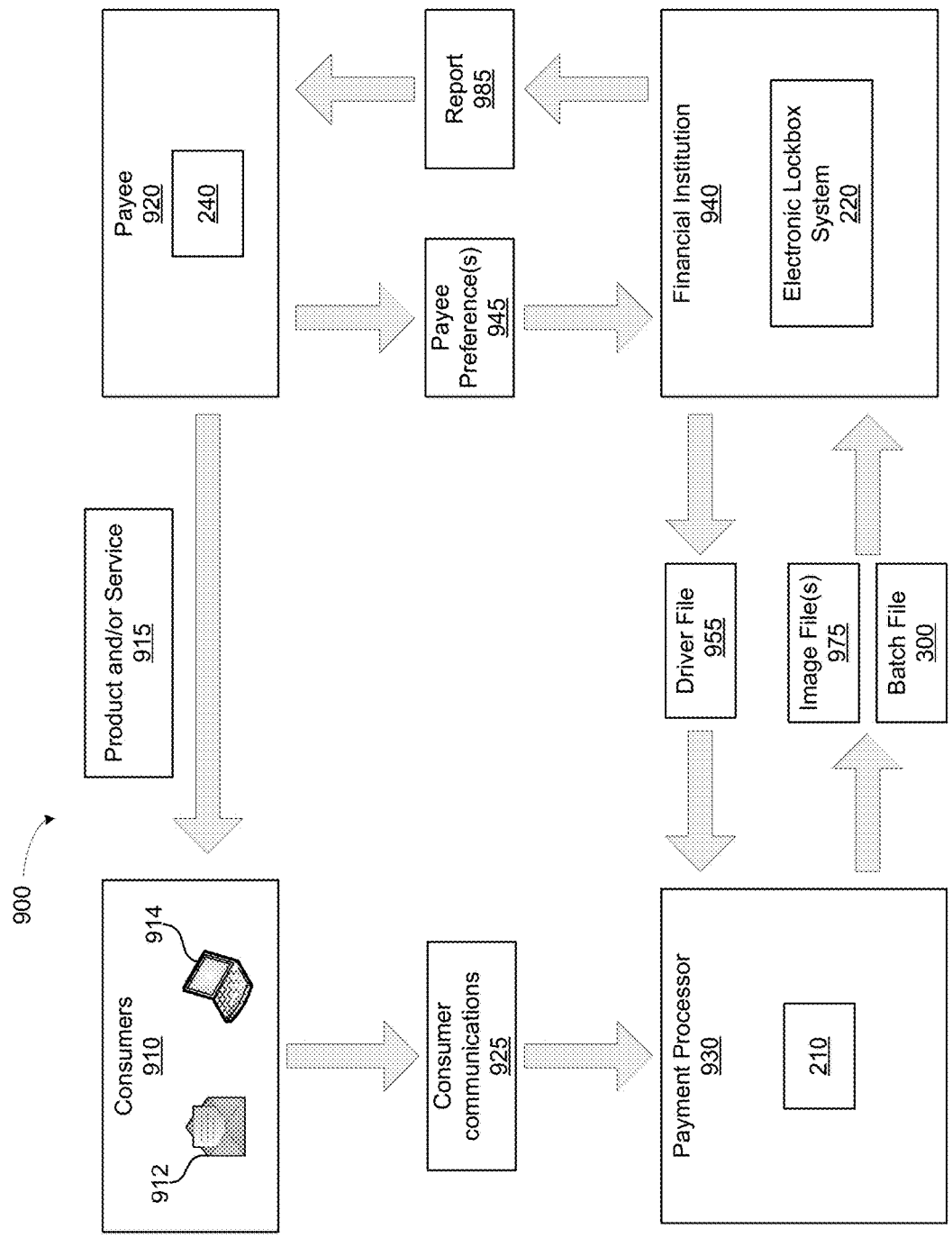
FIG. 9 illustrates a block diagram of an illustrative system for reducing times for processing financial transactions within an electronic lockbox system.

In some cases, the payee may desire to work with one or more other business organizations in processing communications received from one or more consumers. For example, as shown in FIG. 9, the payee 920 may be a business organization providing products and/or services 915 to consumers 910. For example, the payee 920 may include business organizations such as a healthcare provider (e.g., a hospital, a doctor's group, and the like), an insurance provider, a utility (e.g., an electric utility, a natural gas utility, and the like) or the like. Once a product and/or service is provided to the consumers 910, the payee may allow the consumers 950, or a third-party on behalf of the consumers 950, to provide a payment, or other supplemental information, via a postal service and/or electronically using one or more computing devices 914 (e.g., a computer, a smart phone, a tablet, and the like). In some cases, to manage communications sent by the consumers 910, the payee 920 may work with one or more other business organizations (e.g., a payment processor 930, a financial institution 940, and the like) to process consumer communications 925, including transactions (e.g., financial transactions, payments, and the like) and/or other correspondence documents, such as a document including supplemental information requested by and/or provided to the payee 920. For example, the payee 920 may desire the payment processor 930 to collect payor financial transactions and/or other consumer communications 925 over a specified time period (e.g., a month, a week, a year, and the like) and provide the correspondence information, including payment information, to a lockbox provider (e.g., a financial institution 940). For example, a payor transaction may include a payment, or other supplemental information, sent by a consumer and/or by a third-party on behalf of the consumer. The lockbox provider may receive the consumer communications 925 from the payment processor 930 and process one or more payments received from the one or more payors, such as the consumers 910. The lockbox provider may provide a report 985 to the payee 920 that may include information corresponding to the processed payment(s) and/or any other correspondence received from the consumers 910 within the specified time period. In some cases, the payee 920 may desire to receive the report in a specified format. For example, the payee 920 may implement software to manage payment information and/or other correspondence received from consumers 910.

In some cases, this software may be configured to receive the payment information from the lockbox provider in a file, or a series of files (e.g., the report 985). To differentiate correspondence received from different payors (e.g., the consumers 910), the software may be configured to use one or more delimiters. In many cases, the delimiter may be an element common between different communications received from the consumers 910. Because, at least historically, much of the consumer correspondence was received via a postal service, one such common element used as a delimiter may be an envelope and/or an image of an envelope in which the consumer correspondence was sent. However, other delimiters may also be used, such as a payment coupon, a text file including a customer number, or other information that may be used to differentiate between individual consumers or other payors. In some cases, the consumer correspondence may be sent in a way that a specified delimiter may not be received by the payment processor and/or the lockbox provider. In such cases, the specified delimiter, such as an envelope or an image of an envelope, may be simulated such as by the lockbox provider. For example, in the case of an electronically received consumer transaction, an envelope may is not provided with the correspondence. As such, the payment processor 930 and/or the financial institution 940 may produce a simulated envelope image for use as a transaction delimiter in a report 985 communicated to the payee, such as via the network 205. In some cases, a user of the payee computer system 240 may access one or more user interface screens via the user interface 246 to specify a specified delimiter and/or other information specified to be included in the report 985 received from the electronic lockbox system 220. For example, the user may specify that an envelope, or other such information, be used as a delimiter between different consumer communications.

In some cases, the electronic lockbox system 220 may include a data repository 230, a user interface 226, and/or one or more computer devices 225, such as a server 224. In some cases, the data repository 230 may be configured to store instructions for providing an electronic lockbox service and/or for otherwise storing information associated with one or more electronic lockboxes. For example, the data repository 230 may store payee requests that may be received from one or more payees, where the requests may include information used by the payee computer system 240. In some cases, the data repository may be configured to store consumer communication information, such as payment information, consumer correspondence information and/or one or more images of consumer communications that may have been sent via the postal system. In some cases, the data repository 230 may be configured to store a report, or portion of a report, that may be communicated to the payee computer system 240 via the network 205.

In some cases, the data repository 230 may be configured to store instructions, that when executed by the one or more computing devices 225, such as the server 224, cause the one or more computing devices 225 to implement a deposit processor 231, one or more electronic lockboxes 232, such as the electronic lockbox 233, a driver file generator 235, a batch file processor 236, an image generator 237, and/or a report generator 238. In some cases, the server 224 may receive requests (e.g., a requests file, a preferences file, and the like) from the payee computer system 240 via the network 205 for receiving information corresponding to one or more consumer communications and/or payments. In some cases, the driver file generator 235 may be configured to receive the payee requests file and process the payee requests to produce a driver file 955.

In some cases, one or more of the electronic lockboxes 232 may be configurable to process electronic files, paper files and/or a combination of electronic files and paper files. In cases, where an electronic lockbox processes a combination of electronic and paper files, the lockbox may be considered a "hybrid" electronic lockbox 234. In some cases, due to meet regulatory requirements defined by one or more regulatory agencies, the electronic lockbox system 220 may be configured to process certain transactions using physical (e.g., paper) files. For example, the electronic lockbox system 220 may process remittances based on one or more business requirements (e.g., record keeping requirements, foreign currency processing requirements, and the like) that specify that such transactions are to be processed using physical copies, such as to ensure that one or more regulatory requirements are met. Further, the payee may desire to have certain transactions processed using a physical paper copy, such as card payments (e.g., a credit card payment, a debit card payment, a one-time use card payment, and the like), a check drawn on a foreign institution, a remittance in a foreign currency, and the like. To account for such cases, the electronic lockbox system 220 may provide the ability for the lockboxes 232 to process electronic remittance files, paper remittance files or a combination of electronic and paper remittance files.

In some cases, the driver file 955 may be configured to allow the financial institution 940 to communicate payee preferences regarding whether to provide remittance information as an electronic file, as a physical paper communication, or a combination of electronic and paper communications. For example, the payee 920 may define one or more processing scenarios that may use physical paper due to either regulatory needs and/or because a fully electronic process will not accommodate one or more business rules for processing certain remittances, such as foreign checks, card payments, and the like. For example, the payee 920 may provide instructions to accept and/or reject remittances based on payor information, currency information and/or the like. In some cases, remittances requiring collection of foreign currency and/or conversion to a domestic funds type (e.g., conversion from Euros or Japanese Yen to U.S. dollars) may be specified to be sent as a paper remittance. In such cases, the hybrid electronic lockbox 234 may be capable of detecting and/or rejecting remittances not compliant with the payee's instructions. As part of the validation process, the electronic lockbox system 220 may be configured to isolate any item rejected during processing of the electronic batch file and/or the physical paper remittances associated with the lockbox. Once rejected, the electronic lockbox system 220 may communicate the rejected item and/or information about the rejected item to the payee 920 and/or the payment processor 930. In some cases, one or more remittances may be tagged for further inspection to determine whether the remittance meets the payee requirements, such as those regarding electronic communication and/or physical communication, compliance with imaging requirements or currency type requirements, and the like. In such cases, each remittance identified as not meeting a payee preference, may be examined further, either manually or automatically by the electronic lockbox system 220.

In some cases, the driver file 955 may include settings that indicate that an associated electronic lockbox is to be a hybrid electronic lockbox 239. As such, the driver file may specify one or more remittances that are to be physically sent to the financial institution 940. For example, the driver file may specify that remittances in foreign currency and/or drawn on a foreign financial institution are to be communicated physically (e.g., paper) to the financial institution 940. In some cases, other remittances may be communicated as a physical copy when indicated by a government regulation and/or by a business rule. For example, a quality assurance regulation may specify that a certain percentage of remittances (e.g., about 5%, about 10%, etc.) are to be sent as paper copies.

The driver file 955 may be communicated to the payment processor computer system 210 to produce a batch file containing information corresponding to the one or more consumer communications directed to the payee. In some cases, the driver file 955 may be used define a format of a batch file 300 to be produced by the payment processor computer system 210 to communicate information corresponding to the consumer communications 925 received from the payors (e.g., the consumers 910). For example, the driver file 955 may be used to specify a format of the batch file 965, such as the batch file 300 of FIG. 3. By electronically communicating the consumer communications 925 using a batch file 965, the processing time between when the consumers 910 make a payment and the payee 920 receives a record of the payment is greatly reduced, in many cases by several days or, in some cases, weeks.

Figure 3:
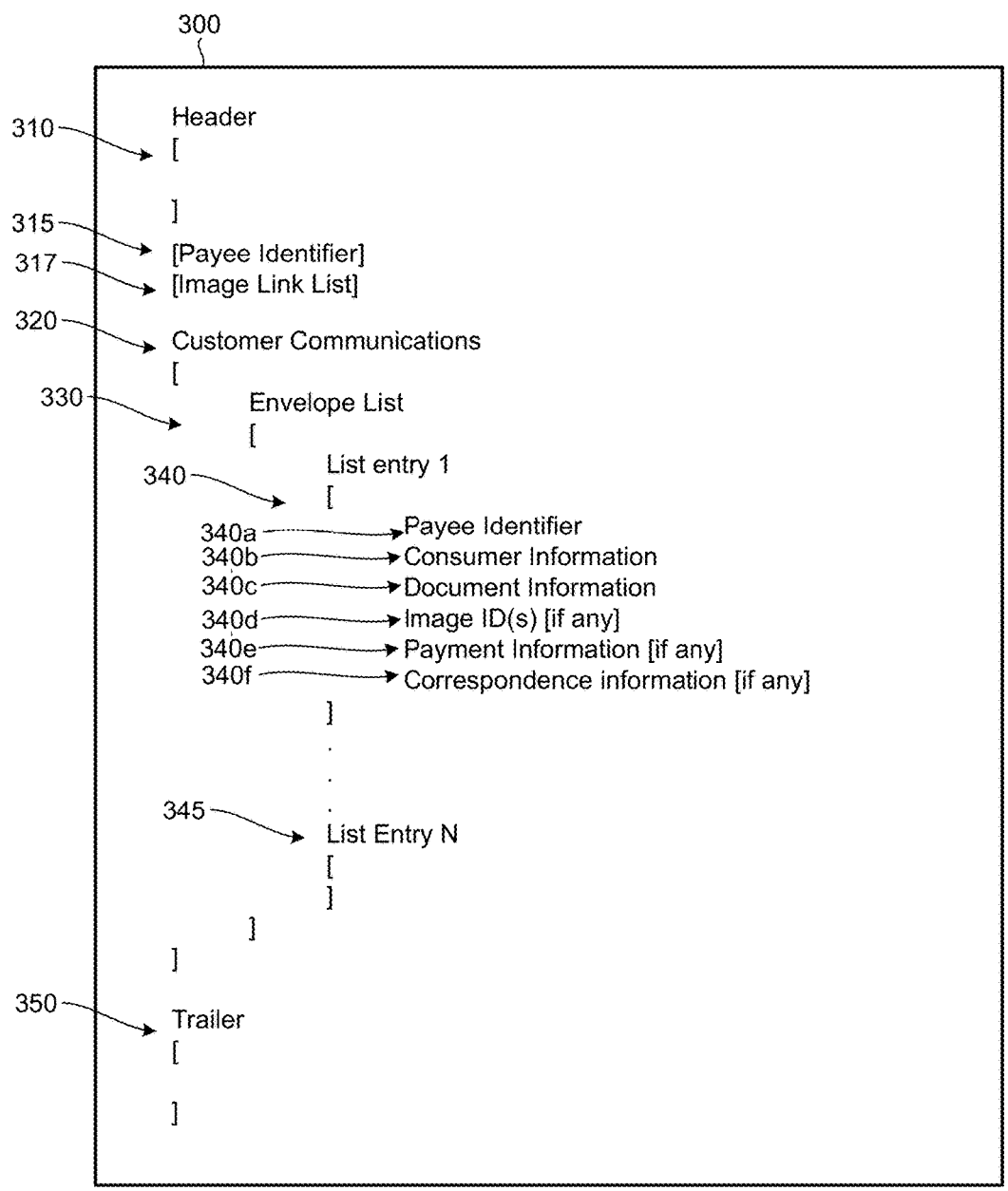
FIG. 3 shows an illustrative batch file for communicating consumer communications information for use at an electronic lockbox system according to one or more illustrative aspects described herein.

For example, FIG. 3 shows an illustrative batch file 300 for communicating consumer communications information for use at an electronic lockbox system according to one or more illustrative aspects described herein. For example, the illustrative batch file 300 may include a header section 310, a customer communication section 320, an envelope list section 330, one or more list entry sections 340, and/or a trailer section 350. In some cases, the batch file 300 may be formatted using a one or more computer languages, such as extensible markup language (XML). The batch file may be used for importing data and/or images into the electronic lockbox system 220 from one or more payment processor computer systems, such as the payment processor computer system 210. In some cases, the batch file may include one or more different transactions and/or communications including one or more documents and/or document images. In some cases, each batch file 300 may be used for an individual batch of consumer communications (e.g., documents and/or payments). In other cases, the batch file 300 may be used to communicate different batches of consumer communications, such as a first group of consumer communications received during a first time period, and a second group of consumer communications during a second time period.

In some cases, the header section 310 may include a batch file format section to specify a version associated with the format of the batch file. For example, one or more requests provided by the payee may change over time, such that the payee may communicate the changes to the electronic lockbox system 220 in a second requests file. In an illustrative example, a payee 920 may desire to update the payee preferences 945 in a requests file on a frequent basis (e.g., daily, weekly, and the like). At such times, the electronic lockbox system 220 may be configured to communicate an updated driver file 955 to the payment processor 930 on a similar frequent basis. For example, if the payee 920 updates the payee preferences 945 on a frequent (e.g., daily) basis, the electronic lockbox system may communicate the driver file 955, which may include updates included in the payee preferences 945, on a same frequent (e.g., daily) basis. For example, the electronic lockbox system 220 may create a second driver file associated with the second requests file, which may then be communicated to the payment processor computer system 210 for use in creating a batch file indicating a different version (e.g., a second version, a third version, and the like) in the header section 310. In some cases, the header section 310 may also include a date and/or time at which the batch file 300 was created and/or communicated to the electronic lockbox system 220. The batch file 300 may further include a payee identifier section 315 for indicating an identity of the payment processor providing the batch file 300. In some cases, the source information (e.g., a payment processor identifier) may be provided at a batch level, such as in the payee identifier section 315, or with individual communications. In some cases, a full lockbox identifier (e.g., xxxx-yyyyyy), or a lockbox number (e.g., yyyyyy) may be provided in the payee identifier section 315. When a full lockbox identifier has been provided, then a site code (e.g., xxxx) may be checked for accuracy.

Often, the payment processor may include one or more images associated with the different consumer communications. The batch file 300 may further include an image link section 317 that may be used for providing a link to the different images associated with the consumer communications (e.g., scanned images of a check, a payment coupon, a letter, and the like). In some cases, the images may be fetched, such as by the electronic lockbox system 220, at a location specified in the image link section 317, such as within an image file 975. In some cases, the images may be included in or otherwise associated with the batch file 300. In some cases, a memory location may be specified in the image link section 317, such as a starting location in a memory (e.g., the data repository 230, the data repository 212, and the like) and/or in the image file 975 at which the images may be fetched. In other cases, one or more of the images may be grouped, such as in a packed format, such as a portable document format (PDF).

In some cases, the customer communications section 320 may include one or more different customer communications, such as those listed in the envelope list 330. The envelope list 330 may include one or more different list entries 340, 345. The envelope list 330 may include or otherwise indicate a set of electronic (e.g., virtual) documents, which may be delimited by a specified delimiter, such as an envelope. Each envelope may be independent from the other envelopes within the envelope list 330. In some cases, each list entry 340, 345 (e.g. an "envelope") may include one or more of a payee identifier 340a, a customer information section 340b, a document information section 340c, one or more image identifiers 340d, a payment information section 340e, and/or a correspondence information section 340f.

An envelope identifier (not shown) may optionally be included. When used, the envelope identifier may be sequentially numbered within the envelope list section 330. Each envelope identifier may be used to refer to a particular envelope within the batch, such as when an error occurs during processing. The payee identifier 340a of a particular list entry 340, 345 may be the same as or different than the payee identifier 315 of the batch file. In cases, where they differ, then the payee identifier at the list entry level may override the batch level payee identifier 315. In some cases, one or more different fields may be defined in the consumer information section 340b. For example, the consumer information may include one or more of a consumer name, a consumer address (e.g., a street address, a city, a state, and the like), a postal code, and/or other consumer identification information (e.g., a phone number).

In some cases, the document information section 340c may optionally include a document identifier. If omitted, each document may be sequentially numbered within each list entry 340, 345. The document identifier information may include one or more of an envelope identification number, a check identification number, a stub identification number, a page number, and/or any combination of such information (e.g., a combined check and stub, a combined stub and check, and the like). In some cases, each document associated with the document information section 340c may be associated with data and/or one or more images. In some cases, one or more of the documents referenced in the document information section 340c may not include any associated data and/or images. In some cases, the information associated with the document section may be considered redundant information, such as when the document data is associated with an envelope, which may correspond to essentially the same information as the consumer information associated with the particular list entry 340, 345. In some cases, each document information section 340c may include one or more different documents, such as an envelope and/or one or more of a check, a coupon, a correspondence document (e.g., a letter), and the like. In some cases, each of the documents associated with the different list entries 340, 345 may be associated with an image identifier, such as an image identifier that may be presented in an image identifier section 340d that may be associated with each of the different documents identified in the document information section 340c. For example, a document may include an image identifier that may include a link to images stored in the data repository 230 and/or a link to an image accessible via the network 205, such as an image stored in the data repository 212 of the payment processor computer system 210. In some cases, images may not be provided for electronic communications and/or transactions. In some cases, an image may be generated from the electronically provided information. The generation of images may not be available in all cases. For example, some images may need branding, which may require a special code. If an image is provided of a check, then an image of both the front and the back of the check may be provided. For non-checks, both the front and the back may be imaged, or in some cases, only a front image may be provided. In some cases, the image identifier section 340d may further include additional information corresponding to the provided images, such as a location for retrieving the image, an identifier of whether a front image or both a front and back image is available, a format identifier (e.g., jpeg, tiff, and the like), a resolution, an image name, and/or the like.

In some cases, the payment information section 340e may be associated with an image in the image identifier section 340d and/or a document in the document information section 340c. For example, an illustrative document in the document information section 340e may be a check, which in turn may include a check image listed in the image identifier section 340d. In some cases, the payment information section 340e may include information associated with a consumer payment made by check, information associated with a consumer payment made using a card, and/or information associated with an electronic consumer payment. For example, the payment information section 340e may include one or more of a check date (e.g., a payment date), a remitter name, an account number, a memo (e.g., a comment section), a payee identifier that may be the same as or different than the payee identifier in the payee identifier section 315 and/or the payee identifier section 340a, a payment amount, and/or a funds type. In some cases, when the payee identifier is different than the payee identifier 315 and/or the payee identifier 340a, the payee identifier associated with the payment information 340e may override the other payee identifiers 315, 340a. In some cases, the payment information may include magnetic ink character recognition (MICR), such as when the payment information is associated with a payment made by a consumer using a check. The MICR information may include a transit number, an account number, and/or a check number.

For a hybrid electronic lockbox 234, the batch file may include an indication whether physical copies remittances are to be associated with the electronic file. For example, the batch file may include an entry in the envelope list 330 corresponding to one or more of the physical remittances sent to the financial institution to be associated with the hybrid electronic lockbox 234. In some cases, the image link list 317 may include an image of the physical remittances to allow for verification once the physical copies are received at the financial institution 940. For example, each physical remittance sent to the financial institution may include an identifier (e.g., a payor name, a control number, and the like) for identification purposes. A corresponding entry may be made in one or more sections of the driver file to ensure that a correct and/or accurate physical copy was received. For example, an image of the physical correspondence may be included in the image link list 317 and/or identifying information associated with the physical correspondence may be included in the envelope list 330. When associating the batch file and the paper copies of the remittances to the hybrid electronic lockbox 234, the identifying information may be checked to ensure that each of the expected physical correspondences were received. In some cases, portions of this verification process may be done manually or electronically, as desired.

In some cases, the trailer section 350 may optionally include summary information (e.g., a total number of entries in the envelope list section 330) and/or communication verification information (e.g., a checksum).

Returning to FIG. 2, the payment processor computer system 210 may provide the batch file 300 to the electronic lockbox system at specified intervals (e.g., monthly). The batch file 300 may be communicated to the electronic lockbox system 220 via the network 205. The electronic lockbox system 200 may receive the batch file 300 and assign the batch file to an electronic lockbox 233 that may be associated with the batch file 300 and/or one or more entries within the batch file. For example, the batch file processor 236 may process the batch file 300 to determine an appropriate lockbox 233 to associate the batch file, such as by comparing the payee identifier 315 with one or more of the payee identifier(s) 340a associated with each of the list entries 340, 345 in the envelope list 330, if provided, to determine the appropriate lockbox 233.

Once to the appropriate electronic lockbox 233, the batch file 300 and/or the image file(s) 975 may be processed by the batch file processor 236, such as to process any payments provided by the one or more consumers, or on behalf of the one or more consumers, and/or to create the report summarizing the consumer communications and/or payments deposited into an account associated with the payee. In some cases, the batch file processor 236 may then process payment information provided in the payment information section 340e associated with the one or more list entries 340, 345. In some cases, the payment information, such as check information, electronic payment information, may be analyzed to determine a funds type associated with each consumer payment in the batch file. If the payment is to be processed using a funds type (e.g., a domestic funds type or an international funds type) not specified by the payee, the payment may be rejected by the electronic lockbox system 220. In some cases, such a rejected transaction may cause the complete batch file to be rejected, so that a notification and/or the batch file may be returned to the payment processor for correction. In such cases, the payee may further be notified of any errors that may occur during processing of the batch file. In other cases, any payment having a rejected funds type may be rejected individually, where the electronic lockbox system 220 may notify one or more of the payee and the payment processor of which transactions had been rejected by the batch file processor 236. In some cases, both domestic funds types and different international funds types may be approved for processing by the payee. Once validated the deposit processor 231 may be configured to process the payment information for deposit into an account associated with the payee.

Once the payments have been processed, the report generator 238 may process the batch file information associated with the lockbox 233. For example, the report generator 238 may be configured to generate a report for communication to the payee computer system 240 based on one or more requests received from the payee computer system 240 in the requests file. The report may provide the payee information corresponding to the consumer communications received at the payment processor during the associated time period (e.g., a month). In some cases, the report may include any correspondence (e.g., a letter) sent by a consumer, or on behalf of the consumer, to the payee. In some cases, the report generator 238 may be configured to generate a report where the information is organized as information (e.g., payment information, correspondence information, and the like) associated with a list of consumers and/or other payors. In some cases, this information may be organized using delimiters, such as an envelope image. When no envelope image is available, such as for electronically received communications at the payment processor computer system 210, an envelope image, a correspondence image, a coupon image, and/or another image, may be generated, such as by the image generator 237. The report generator 238 may then generate a report 985 detailing the received consumer correspondence (e.g., letters, payments, and the like) using the batch file 300, the physical communications, and/or the associated image file(s) 975 received during the associated time period, using the envelope image delimiter and/or a simulated envelope image, that may be simulated by the image generator 237. The report generator 238 may be capable of reporting the remittance information to the payee using an electronic remittance report, a paper remittance report or a report including both electronic remittances and paper remittances based on one or more payee requirements.

FIGS. 4A-4E illustrate example portions of mail imaged at a payment processor computer system 210 according to one or more illustrative aspects described herein. In some cases, one or more payors may send correspondence directed to the payee, wherein the correspondence may include a payment and/or another communication (e.g., a letter, an explanation, and the like). In some cases, the address to which the consumer directs the correspondence may correspond to an address associated with the payment processor. In some cases, the correspondence may be sent electronically, such as by email, via a website, and/or the like, thereby partially or even completely avoiding the need to physically mail/deliver papers in association with a lockbox transaction. In other cases, the consumer communications may be sent via a postal system.

For example, mail 912 may be dropped off (such as by a payor) at a post office or other public or private mail delivery or courier service. At the post office, mail may be sorted and distributed to one or more destinations in accordance with the destination address indicated on the items of mail. However, at least some items of mail bearing a specific destination identifier, such as a specific destination address or portion thereof (e.g., a specific zip code or lockbox identifier), may be routed to a location associated with the payment processor. For example, mail that may be addressed to one or more predetermined lockboxes having specific zip codes and/or lockbox identifier may be routed by the post office a geographic location associated with the payment processor. Once received at the payment processor location, the mail, or other correspondence, may be processed by the payment processor computer system 210.

In some cases, the payment processor computer system 210 may include one or more scanning devices (scanners) 218, one or more other computing devices (e.g., processors or servers) 215, and one or more data repositories 212. The scanners may scan images of the mail received by the payment processor, which may then be communicated to the electronic lockbox system 220 such as by electronic means. In some cases, the outer surface of the envelope 410 and/or the contents of the envelope 410 may be scanned by the scanners 218. Each envelope 410 may contain any types of one or more documents. For example, each envelope may contain payment information (e.g., a check 412, card information, a money order, and the like), coupons 411, and/or supplemental correspondence 413, as illustrated by way of example in FIGS. 4B-4E. The scanned images may be sent to one or more servers 214 by the scanners 218. The scanned images may be converted to text by the server 214. The scanned images may, in turn, be converted to text in any suitable manner, such as through optical character recognition ("OCR"). Moreover, any magnetic ink (such as commonly used on checks) may be magnetically scanned by scanners 218 and interpreted using magnetic ink character recognition (ICR) techniques.

As discussed in further detail below, the information scanned from the mail may be compared, verified and/or grouped or otherwise combined into electronic transactions by the server 214. Additionally, the server 214 may classify the electronic transactions. The server 214 may also sort the electronic transactions and create batches of electronic transactions containing one or more of the same identifiers. The electronic transactions may be sent to the electronic lockbox system 220 via the network 205 for processing. The processing of the transaction may include processing any type of transaction, such as crediting a client's account, debiting a client's account, sending a remittance, and/or storing correspondence, and the like. After at least some of the electronic transactions are processed, the computing devices 225 may send information representing or otherwise describing the transactions to the data repository 230. The data repository 230 may be configured to generate reports relating to the electronic transactions and/or to the accounts associated with the electronic transactions, such as by the report generator 238.

Figure 4A:
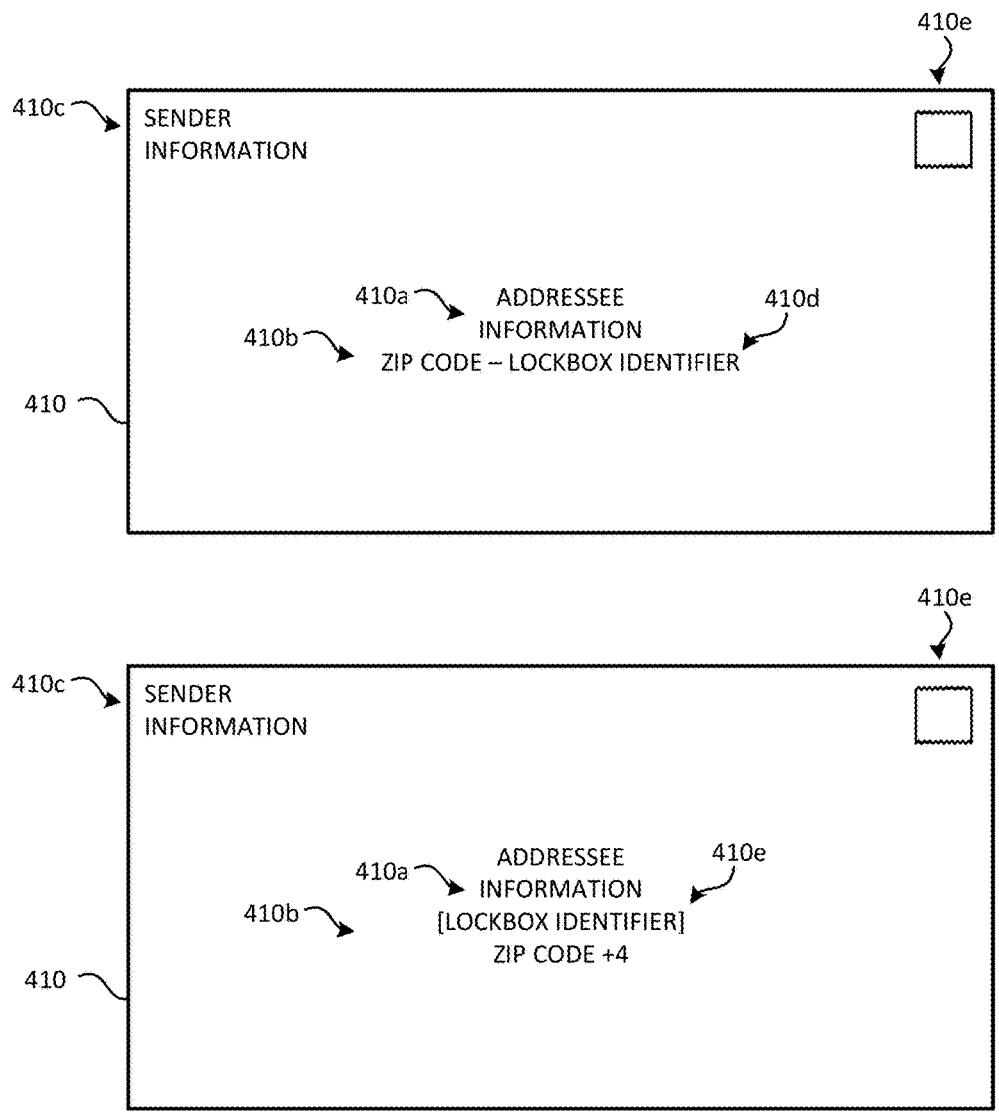
FIGS. 4A-4E illustrate example portions of mail imaged at a payment processor computer system according to one or more illustrative aspects described herein.
Figure 4B:
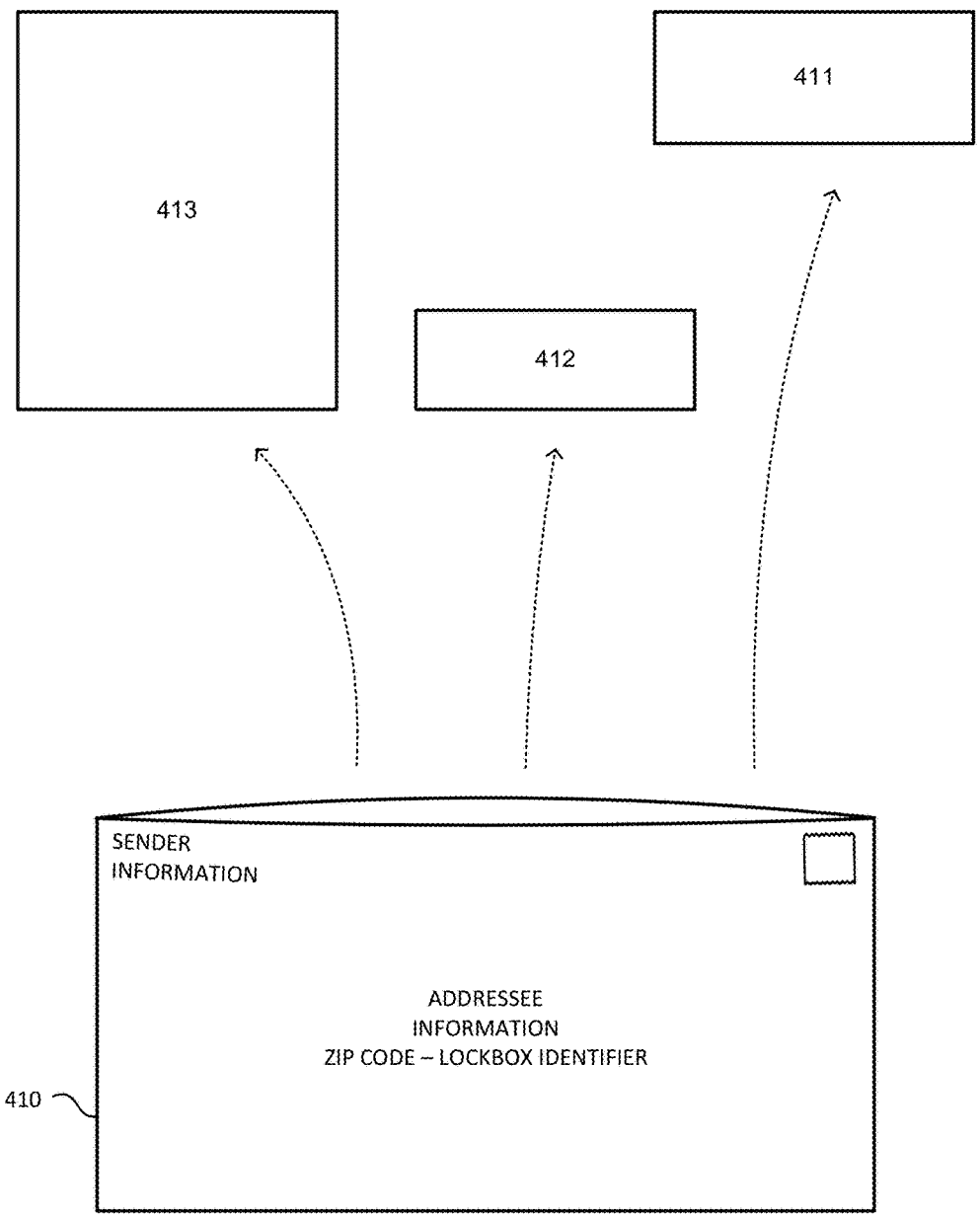

In an illustrative example, FIG. 4A shows an illustrative envelope 400 that may be sent via the postal system to be received at the payment processor computer system 210 of FIG. 2. For example, instructions may be provided to a postal distribution center or post office to route certain mail to a location associated to the payment processor based, at least in part of on information indicated (e.g., printed or written) on the outside of the envelope 400. For example, the mail 912 may be routed based on a destination address 410a, a destination zip code 410b, and/or a lockbox identifier 410d, 410e indicated on the outside of the envelope 400. Alternatively, the mail 912 may be routed based on the sender's information 410c indicated on the outside of the envelope 400. Once received at the payment processor location, the payment processor computer system 210 may be configured to gather information associated with the consumer correspondence. For example, the outer surfaces of one or more envelopes, such as the envelope 400, to extract a set of information from an image of each of the one or more envelopes. For example, the server 214 may be configured to extract information from each of the envelope images obtained by the scanner 218. The images may then be stored in the data repository 212, such as in one or more image files 975.

Figure 4C:
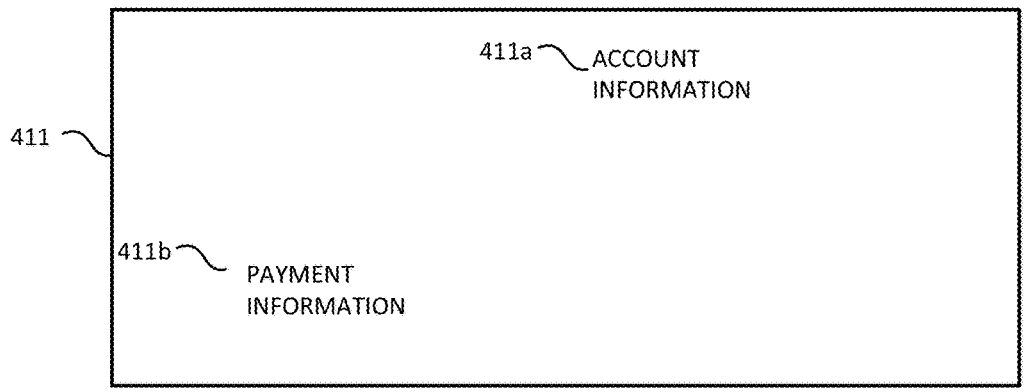
Figure 4D:
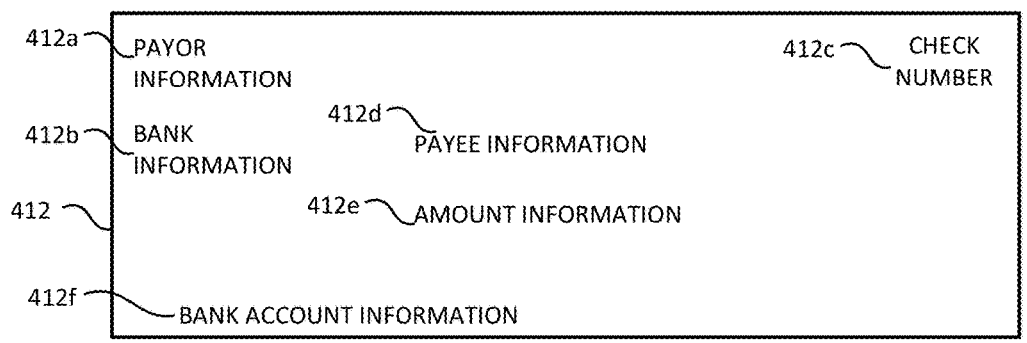
Figure 4E:
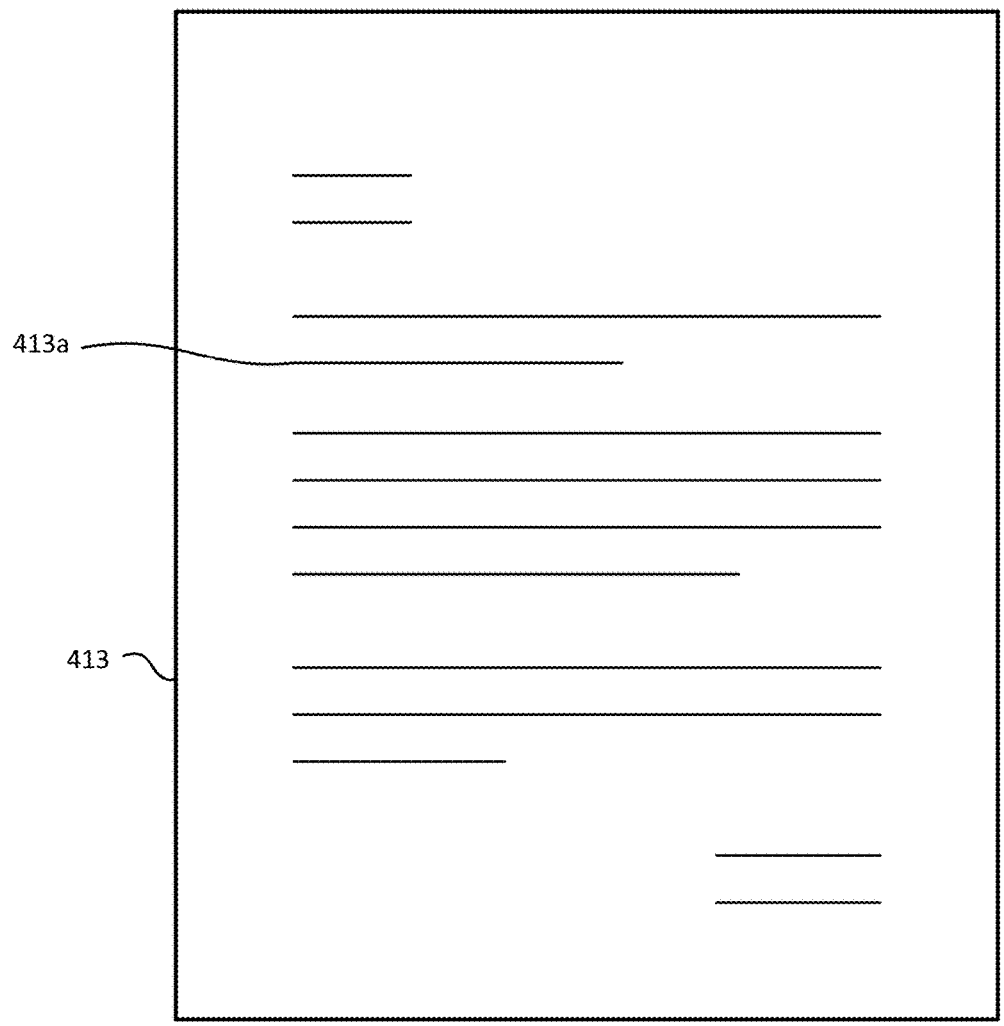

Any type of information may be extracted from the envelopes. For example, the envelopes may contain a destination address 410a, a destination zip code 410b, a destination lockbox identifier 410d, 410e and/or the sender's information 410c, as illustrated in FIG. 4A. In some cases, the contents of each of the envelopes may be scanned, such as by scanner 218. The envelope 410 may contain any type of documents, including checks 412, coupons 411, and/or supplemental correspondence 413, as illustrated in FIGS. 4C-4E.

In some cases a second set of information associated with each of the envelopes may be extracted from the images and/or scanned magnetic ink of each the items within the envelope 410. The second set of information may be extracted from the images by processors 214. Any type of information may be extracted from the items within the envelopes 410. For example, information such as the account information 411a, payment information 411b (e.g., a payment amount, card information, bank account transfer information, and the like), consumer information, 412a, bank information 412b, check number 412c, payee information 412d, amount information 412e, bank account information 412f, and/or supplemental information 413a, as illustrated in FIGS. 4C-4E, may be extracted. The extracted first and second sets of information for each of the envelopes may be converted into readable text and/or other symbols through any suitable method, such as OCR or ICR by the server 214 for inclusion in the batch file.

In some cases, the first set of information may be compared to the second set of information for each of the envelopes to determine if the first and second sets of information are associated with each other as expected. The server 214 may perform the comparison of the first and second sets of information. Any type of information within the first set of information and the second set of information may be compared. For example, the sender's information 410c may be compared to the account information 411a to determine if the two correspond to each other. In another example, the destination address 410a, destination zip code 410b, and/or destination lockbox identifier 410d, 410e may be compared with the account information 411a to determine if the account information 411a is routinely sent. Additionally, the first set of information and/or the second set of information may be verified by the server 214, to determine the authenticity of the information. Any type information may be contained and verified in the second set of information. For example, if one of the items scanned was a check, the payee's signature may be verified to determine the authenticity. In some cases, the batch file processor 236 may be configured for verifying the authenticity of the account information, as discussed above.

In some cases, the electronic transactions may be sorted by any suitable criteria, such as by information contained within the first set and/or second set of information. For example, the electronic transactions may be sorted by information or identifiers within the first set of information, such as the destination address 410a, destination zip code 410b, destination lockbox identifier 410d, 410e, or the sender's information 410c. Additionally, or alternatively, the electronic transactions may be sorted by information or identifiers within the second set of information. For example, the electronic transactions may be sorted by the type of transaction (e.g., a check payment, a card payment, an electronic payment, and the like), account information 411a, payment information 411b, consumer information, 412a, bank information 412b, check number 412c, payee information 412d, amount information 412e, bank account information 412f, and/or supplemental information 413a. After the electronic transactions have been sorted, batches of electronic transactions may be created, such as the batch file associated with a particular payee. Each of the batches of electronic transactions may include transactions having one or more of the same identifiers.

In some cases, a communication addressed to a payee (e.g., an electronic lockbox 233) may include a remittance that is sent to a third party and processing the transaction includes sending the remittance to the third party. The electronic transactions may be processed as a batch or the electronic transactions may be processed one at a time. In at least one example, each batch of electronic transactions are processed together or at the same time.

Figure 5:
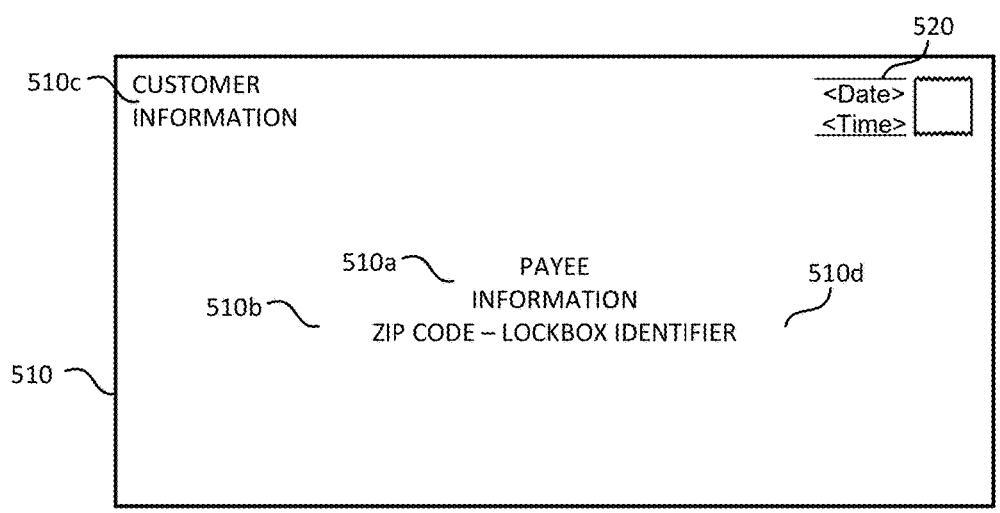
FIG. 5 shows an illustrative simulated envelope image created using information received at the electronic lockbox from the payment processor.

FIG. 5 shows an illustrative simulated envelope image 500 created using information received at the electronic lockbox from the payment processor. The simulated envelope image 500 may be created to look similar to a scan of an actual envelope, such as the envelope image of FIG. 4A. For example, for one or more electronically received communications, the simulated envelope image 500 may include one or more of a destination address 510a, a destination zip code 510b, a destination lockbox identifier 510d, and the consumer's information 510c. In some cases, the simulated envelope image may include a simulated postal mark 520 that may be used to provide information corresponding to when an electronic communication was received at the payment processor computer system 210. For example, the simulated postal mark 520 may include a date and/or a time at which the communication was sent by the payor, received at the payment processor computer system 210, or both. In some cases, the simulated postal mark may be created to look similar to an actual postal mark provided by the postal service.

Figure 6:
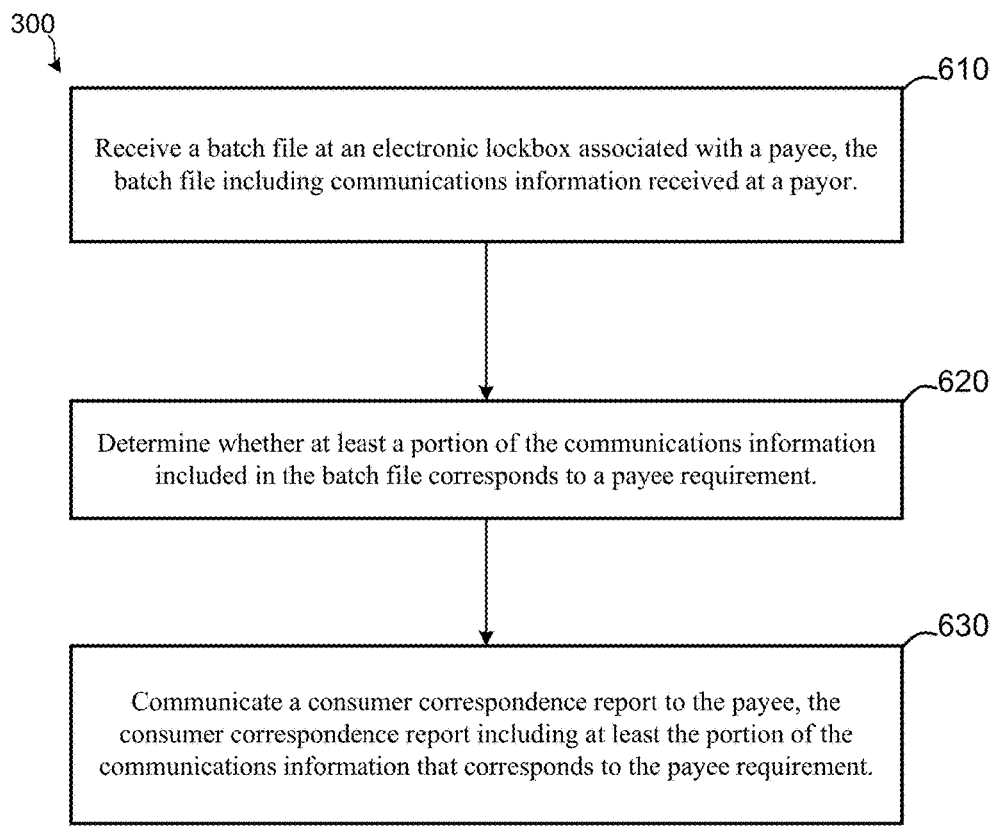
FIGS. 6 and 7 illustrate examples of at least a portion of illustrative flow diagrams of methods for managing an electronic lockbox according to one or more illustrative aspects described herein.
Figure 7:
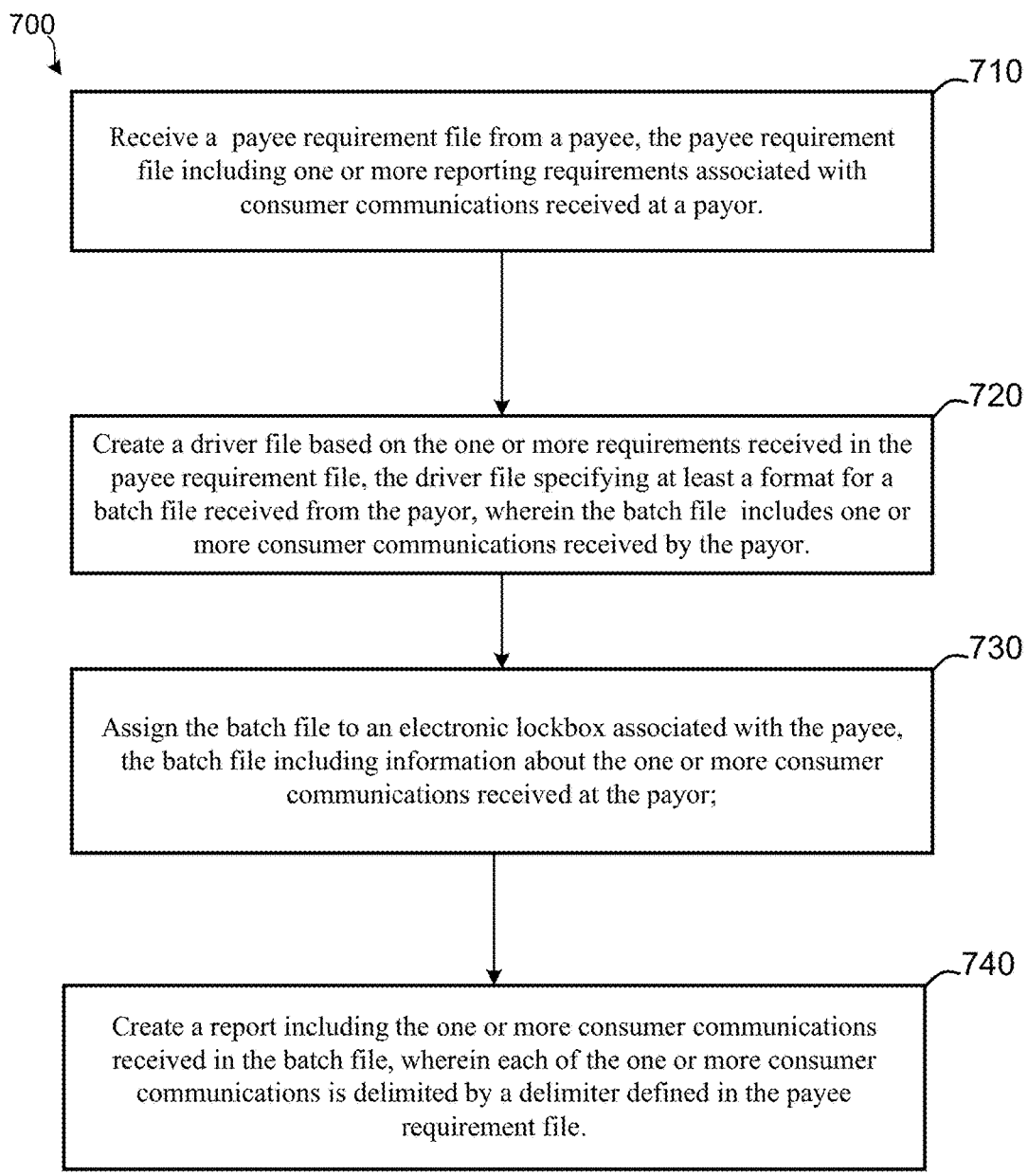

FIGS. 6 and 7 illustrate examples of at least a portion of illustrative flow diagrams of methods 600, 700 for managing an electronic lockbox 233 according to one or more illustrative aspects described herein. In some cases, the method 600 may begin at step 610, where a computer device (e.g., the computer device 224) may be configured to receive a batch file at an electronic lockbox 233 associated with a payee. The batch file may include consumer correspondence information associated with correspondence between at least one payor and the payee. At step 620, the computer device 224 may determine whether at least a portion of the communications information included in the batch file corresponds to a payee request. In some cases, the payee request may correspond to a delimiter associated with a correspondence report to be received at the payee computer system 240. For example, the payee computer system 240 may be configured to use a delimiter (e.g., an envelope image) to differentiate between different consumer communications. In other cases, the payee request may be associated with processing a payment received by a payor, such as an allowable funds type to be processed by the electronic lockbox system, such as a domestic funds type. At step 630, the computer device 224 may communicate a consumer correspondence report to the payee computer system 240. The consumer correspondence report may include at least the portion of the communications information that corresponds to the payee request, such as using an envelope image, or other information associated with the envelope, as a delimiter between different consumer communications.

In some cases, the computer device 224 may be configured to receive information corresponding to one or more payee requests, where the one or more payee requests may include at least one of a report format request and a payment request. For example, the report format request may comprise a delimiter request. In such cases, the delimiter (e.g., an envelope image) may be used to identify individual consumer correspondence within the consumer correspondence report. In some cases, the method 600 may further include creating, by the computer device 224, a simulated envelope image 500 associated with an electronic consumer correspondence that was electronically received at the payment processor computer system 210. In some cases, the simulated envelope image 500 may be used as the delimiter between transactions associated with different payors.

In some cases, the computer device 224 may be further configured to identify information corresponding to one or more financial transactions in the batch file. For example, the computer device 224 may identify one or more financial transaction are between the at least one payor and the payee. The computer device 224 may then be configured to deposit funds associated with the one or more financial transactions into an account associated with the payee, wherein a type of the finds is included as a payee request. In some cases, identifying, by the computer device 224, information corresponding to the one or more financial transactions in the batch file may include identifying a funds type associated with each of the one or more transactions, comparing the identified funds type with a specified funds type included as a payee request, and/or rejecting the one or more financial transactions that may be associated with a funds type different than the funds type included as a payee request. The computer device may further be configured to communicate one or more of the rejected financial transaction to at least one of the payment processor, via the payment processor computer system 210, and/or the payee, via the payee computer system 240.

In some cases, the method 600 may include identifying, by the computer device 224, an electronic lockbox 233 associated with the batch file and assigning the batch file to the identified electronic lockbox 233. For example, identifying the electronic lockbox 233 associated with the batch file may include comparing, by the computer device 224, a first electronic lockbox identifier associated with a header section of the batch file with a second electronic lockbox identifier associated with a particular consumer communication included in the communications information of the batch file. In response to the comparison, the computer device 224 may assign the batch file to the electronic lockbox associated with the second electronic lockbox identifier when the second lockbox identifier is different than the first electronic lockbox identifier.

In some cases, another illustrative method 700 may begin at 710 by receiving, by the computer device 224, a payee request file from a payee. The payee request file may include one or more reporting requests associated with consumer communications received at a payment processor. At 720, the computer device 224 may create a driver file based on the one or more requests received from the payee computer system 240 in the payee request file. In some cases, the driver file may specify at least a format for a batch file to be provided by the payment processor computer system 210, where the batch file may include information corresponding to one or more consumer communications received by the payment processor. At 730, the computer device 224 may assign the batch file to an electronic lockbox 233 associated with the payee. The batch file may include information corresponding to the one or more consumer communications received at the payment processor. At 740, the computer device 224 may create a report that may include the one or more consumer communications received in the batch file. The report may be formatted such that each of the one or more consumer communications is delimited by a delimiter (e.g., an envelope image 410, 500, an alphanumeric character string, a symbol, and the like) as defined in the payee request file.

In some cases, the method 700 may further include creating, by the computer device 224, the simulated envelope image 500 that may correspond to each of the one or more customer communications received electronically by the payment processor. The computer device 224 may create the report using a delimiter, such as an envelope image delimiter between different consumer communications. The envelope image delimiter may correspond to at least one of an image of an actual envelope 410 when the consumer communication is received by mail by the payment processor and the simulated envelope image 500 when the consumer communication is received electronically by the payment processor.

Figure 8:
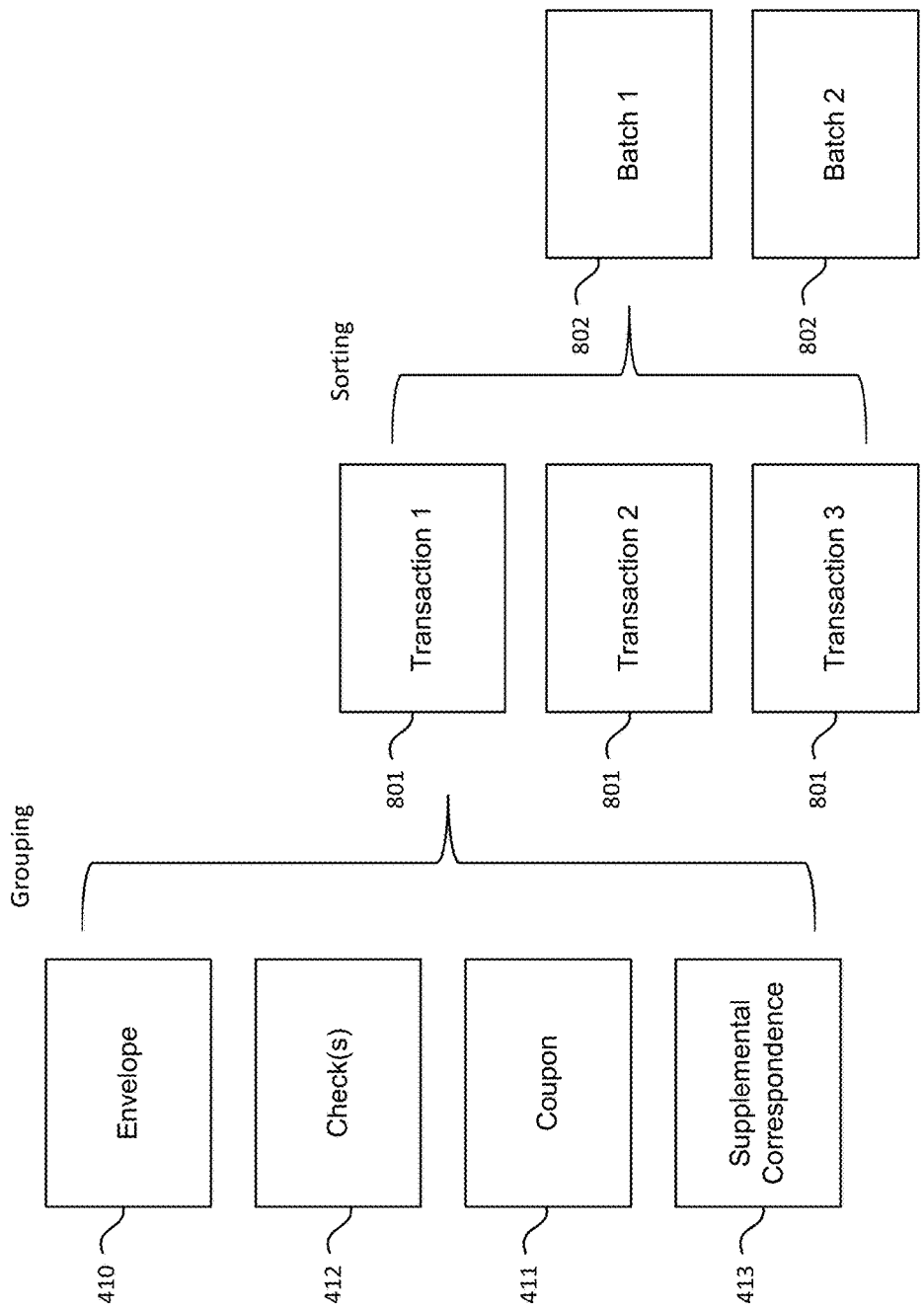
FIG. 8 illustrates an example of at least a portion of an organizational hierarchy for managing consumer communication information in a batch file for use by an electronic lockbox according to one or more illustrative aspects described herein.

FIG. 8 illustrates an example of at least a portion of an organizational hierarchy for managing consumer communication information in a batch file for use by an electronic lockbox 233 according to one or more illustrative aspects described herein. In some cases, electronic communications and/or mail received from one or more payors may be sorted and batched into an electronic transaction form. The electronic transactions 801 may be sorted by any identifier contained in the first set of information or the second set of information. In some cases, the electronic lockbox 220 may be configured to receive one or more batch files 802 based on consumer communications received at a payment processor site. The consumer communications may include electronic communication and/or physical mail communications. In some cases, the electronic communications may be received in a form (e.g., an email, a web form, and the like) that may directly be usable as an electronic transaction 801 that may be included in a particular batch file 802. For example, an electronic transaction 801 may be entered in the batch file 802 as an entry in the envelope list 330. In some cases, a postal communication, such as the envelope 410 and its contents (e.g., the check(s) 412, the coupon 411, the supplemental information 413a, and the like) may be scanned, where the subsequent scanned information may be stored as an electronic transaction 801 for inclusion in the batch file 802.

Various aspects described herein may be embodied as a method, an apparatus, or as computer-executable instructions stored on one or more non-transitory and/or tangible computer-readable media. Accordingly, those aspects may take the form of an entirely hardware implementation, an entirely software implementation (which may or may not include firmware) stored on one or more non-transitory and/or tangible computer-readable media, or an implementation combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:
sending, by a driver file generator via a network to a payment processor computing system, a driver file that identifies an information format of a batch file including a payee preference and defines one or more rules to identify remittances to be assigned to a hybrid electronic lockbox, wherein the remittances include a plurality of physical remittances and a plurality of electronic remittances received at the payment processor computing system between payors and a payee within a specified time period;

receiving, via the network from the payment processor computing system by a batch file processor of a hybrid electronic lockbox computing system, the batch file associated with the payee, the batch file including the rules and scanned copies of the plurality of physical remittances and information corresponding to the plurality of electronic remittances, wherein the scanned copies of the plurality of physical remittances includes an image of a physically received envelope for each physical remittance;

assigning, by the batch file processor, the batch file to a hybrid electronic lockbox associated with the payee;

generating, by an image generator, a simulated envelope image for each of the plurality of electronic remittances, wherein the simulated envelope image comprises an image formatted to resemble a scanned physical envelope had one been associated with a particular electronic remittance, wherein the simulated envelope image includes at least one of information capable of identifying a consumer associated with a financial transaction or an identifier of the hybrid electronic lockbox; and generating, by a report generator, a report including the plurality of electronic remittances and the plurality of physical remittances associated with the batch file, wherein the report includes a plurality of delimiters between each of the plurality of electronic remittances and each scanned copy of the plurality of physical remittances and wherein each delimiter comprising one of an associated scanned physical envelope or an associated simulated envelope image, each delimiter including information capable of identifying at least one of a consumer associated with the financial transaction or a lockbox identifier.

2. The method of claim 1, wherein the batch file and the physical remittances comprise information associated with a plurality of financial transactions between one or more payors and the payee.

3. The method of claim 1, wherein the payee preference comprises a desired sequence of documents associated with each of the plurality of electronic remittances.

4. The method of claim 1, wherein the payee preference comprises a delimiter identifying individual financial transactions within the report.

5. The method of claim 4, wherein the payee preference identifies a transaction to be communicated as a physical remittance.

6. The method of claim 1, further comprising:
creating, by the image generator, the simulated envelope image for use as a delimiter identifying individual financial transactions within the report based on the payee preference.

7. The method of claim 1, comprising:
identifying, by a deposit processor, payment information corresponding to the plurality of electronic remittances in the batch file and the scanned copies of the plurality of physical remittances; and
depositing funds associated with the plurality of electronic remittances into an account associated with the payee, wherein a type of the funds is identified by the payee preference.

8. The method of claim 7, wherein identifying payment information corresponding to the plurality of electronic remittances in the batch file comprises:
identifying a funds type associated with each of the plurality of electronic remittances;
comparing the funds type with the type of the funds identified by the payee preference;
rejecting one or more of the electronic remittances having a funds type different than the type of funds identified by the payee preference; and
requesting a physical remittance corresponding to each of one or more financial transactions rejected for having a funds type different than the funds type identified by the payee preference.

9. The method of claim 8, further comprising depositing funds associated with the one or more physical remittances into an account associated with the payee.

10. The method of claim 1, further comprising:
comparing a first electronic lockbox identifier associated with the batch file with a second electronic lockbox identifier associated with at least one of the plurality of electronic remittances included in the batch file; and
assigning the batch file to an electronic lockbox associated with the second electronic lockbox identifier responsive to determining that the second lockbox identifier is different from the first electronic lockbox identifier.

11. A system comprising:
a network; and
a hybrid electronic lockbox computing device comprising a processor and a non-transitory memory device storing instructions that, when executed by the processor, cause the hybrid electronic lockbox computing device to:
send, by a driver file generator via the network to a payment processor computing system, a driver file that identifies an information format of a batch file including a payee preference and defines one or more rules to identify remittances to be assigned to a hybrid electronic lockbox, wherein the remittances include a plurality of physical remittances and a plurality of electronic remittances received at the payment processor computing system between payors and a payee within a specified time period;
receive, by a batch file processor, the batch file associated with the payee, the batch file including the rules and scanned copies of the plurality of physical remittances and information corresponding to the plurality of electronic remittances, wherein the scanned copies of the plurality of physical remittances includes an image of a physically received envelope for each physical remittance;
assign, by the batch file processor, the batch file to a hybrid electronic lockbox associated with the payee;
generate, by an image generator, a simulated envelope image for each of the plurality of electronic remittances, wherein the simulated envelope image comprises an image formatted to resemble a scanned physical envelope had one been associated with a particular electronic remittance, wherein the simulated envelope image includes at least one of information capable of identifying a consumer associated with a financial transaction or an identifier of the hybrid electronic lockbox; and
generate, by a report generator, a report including the plurality of electronic remittances and the plurality of physical remittances associated with the batch file, wherein the report includes a plurality of delimiters between each of the plurality of electronic remittances and each scanned copy of the plurality of physical remittances and wherein each delimiter comprising one of an associated scanned physical envelope or an associated simulated envelope image, each delimiter including information capable of identifying at least one of a consumer associated with the financial transaction or a lockbox identifier.

12. The system of claim 11, wherein the batch file and the physical remittances comprise information associated with a plurality of financial transactions between one or more payors and the payee.

13. The system of claim 11, wherein the payee preference comprises a desired sequence of documents associated with each of the plurality of electronic remittances.

14. The system of claim 11, wherein the payee preference comprises a delimiter identifying individual financial transactions within the report.

15. The system of claim 11, wherein the payee preference identifies a transaction to be communicated as a physical remittance.

16. The system of claim 11, wherein the non-transitory memory device stores instructions that, when executed by the processor, cause the hybrid electronic lockbox computing device to:
  create, by the image generator, the simulated envelope image for use as a delimiter identifying individual financial transactions within the report based on the payee preference.

17. The system of claim 11, wherein the non-transitory memory device stores instructions that, when executed by the processor, cause the hybrid electronic lockbox computing device to:
  identify, by a deposit processor, payment information corresponding to the plurality of electronic remittances in the batch file and the scanned copies of the plurality of physical remittances; and
  deposit funds associated with the plurality of electronic remittances into an account associated with the payee, wherein a type of the funds is identified by the payee preference.

18. The system of claim 11, wherein the non-transitory memory device stores instructions that, when executed by the processor, cause the hybrid electronic lockbox computing device to:
  identify a funds type associated with each of the plurality of electronic remittances;
  compare the funds type with the type of the funds identified by the payee preference;
  reject one or more of the financial transactions having a funds type different than the type of funds identified by the payee preference; and
  request a physical remittance corresponding to each of one or more electronic remittances rejected for having a funds type different than the funds type identified by the payee preference.

19. The system of claim 18, wherein the non-transitory memory device stores instructions that, when executed by the processor, cause the hybrid electronic lockbox computing device to:
  deposit funds associated with the one or more physical remittances into an account associated with the payee.

20. The system of claim 11, wherein the non-transitory memory device stores instructions that, when executed by the processor, cause the hybrid electronic lockbox computing device to:
  compare a first electronic lockbox identifier associated with the batch file with a second electronic lockbox identifier associated with at least one of the plurality of electronic remittances included in the batch file; and
  assign the batch file to an electronic lockbox associated with the second electronic lockbox identifier responsive to determining that the second lockbox identifier is different from the first electronic lockbox identifier.

* * * * *